(12) United States Patent
Kuykendall et al.

(10) Patent No.: US 11,332,884 B2
(45) Date of Patent: *May 17, 2022

(54) DEICER COMPOSITION AND METHOD OF MAKING

(71) Applicant: NW Straw Pulp, LLC, Dayton, WA (US)

(72) Inventors: Keith C. Kuykendall, Waitsburg, WA (US); David W. Wilkening, Ronan, MT (US)

(73) Assignee: NW Straw Pulp, LLC, Dayton, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/874,956

(22) Filed: May 15, 2020

(65) Prior Publication Data

US 2020/0369932 A1     Nov. 26, 2020

Related U.S. Application Data

(60) Provisional application No. 62/850,011, filed on May 20, 2019.

(51) Int. Cl.
  *C09K 3/18* (2006.01)
  *D21C 11/10* (2006.01)
  *D21C 11/00* (2006.01)

(52) U.S. Cl.
  CPC .......... *D21C 11/0042* (2013.01); *C09K 3/185* (2013.01); *D21C 11/0007* (2013.01); *D21C 11/10* (2013.01)

(58) Field of Classification Search
  CPC .......... D21C 11/00042; D21C 11/0042; D21C 11/0007; C09K 3/185
  See application file for complete search history.

(56) References Cited

U.S. PATENT DOCUMENTS

| 1,966,820 | A | * | 7/1934 | Jones | C05F 1/02 |
| | | | | | 71/29 |
| 4,096,028 | A | * | 6/1978 | Rosenberger | G05D 21/02 |
| | | | | | 162/49 |
| 6,287,480 | B1 | | 9/2001 | Berglund et al. | |
| 6,821,453 | B2 | | 11/2004 | Chon et al. | |
| 6,852,247 | B2 | | 2/2005 | Bytnar | |
| 7,556,742 | B1 | | 7/2009 | Ghamaghami Rad | |

(Continued)

FOREIGN PATENT DOCUMENTS

CN   100355691 C  * 12/2007

OTHER PUBLICATIONS

Ehrenhauser et al., Sugar and Salt From Sugarcane, Aug. 23, 2017 [downloaded online Aug. 15, 2021], Audubon Sugar Institute. (Year: 2017).*

*Primary Examiner* — Anthony Calandra
(74) *Attorney, Agent, or Firm* — von Briesen & Roper, s.c.

(57) ABSTRACT

A deicer composition is disclosed. The deicer composition may comprise water, a metal chloride salt, and a biopolymer composition derived from wheat straw, alfalfa, or other cereal grain straws. The biopolymer composition may include inorganic material and a copolymer comprised of lignin and polysaccharides. The biopolymer composition may have an average molecular weight of between 3500 and 5500 Daltons. The metal chloride salt may be selected from magnesium chloride, calcium chloride, and sodium chloride.

5 Claims, 4 Drawing Sheets

(56) References Cited

U.S. PATENT DOCUMENTS

| | | |
|---|---|---|
| 7,563,386 B2 | 7/2009 | Bytnar |
| 7,632,421 B2 | 12/2009 | Bytnar |
| 7,947,193 B2 | 5/2011 | Bytnar et al. |
| 7,972,530 B2 | 7/2011 | Wehner et al. |
| 8,226,846 B2 | 7/2012 | Hartley et al. |
| 8,562,854 B2 | 10/2013 | Chauhan et al. |
| 8,679,364 B2 | 3/2014 | Pylkkanen |
| 8,778,216 B2 | 7/2014 | Zhao et al. |
| 8,808,572 B2 | 8/2014 | Trujillo et al. |
| 8,845,923 B2 | 9/2014 | Pylkkanen et al. |
| 8,852,450 B2 | 10/2014 | Bradt et al. |
| 8,858,826 B2 | 10/2014 | Sapienza et al. |
| 8,906,251 B2 | 12/2014 | Sapienza et al. |
| 9,080,092 B2 | 7/2015 | Chauhan et al. |
| 9,096,787 B2 | 8/2015 | Rowley et al. |
| 9,133,378 B2 | 9/2015 | Maslow et al. |
| 9,150,767 B2 | 10/2015 | Demmer et al. |
| 9,163,172 B2 | 10/2015 | De Jong et al. |
| 9,243,176 B2 | 1/2016 | Chauhan et al. |
| 9,309,449 B2 | 4/2016 | Koefod |
| 9,434,868 B2 | 9/2016 | McConnell |
| 11,066,588 B2 * | 7/2021 | Lewis ................. C09K 5/10 |
| 2010/0009073 A1 | 1/2010 | Bytnar et al. |
| 2012/0325421 A1 * | 12/2012 | Li ......................... D21C 3/22 |
| | | 162/189 |
| 2019/0153280 A1 | 5/2019 | Lewis et al. |

* cited by examiner

DEICER COMPOSITION AND METHOD OF MAKING

FIELD OF THE INVENTION

This disclosure generally relates to deicer compositions and, more particularly, to deicer compositions containing a chloride-based salt and a biopolymer composition.

BACKGROUND

Deicing is the process of removing snow, ice, or frost from surfaces such as roadways, walkways, and aircraft component surfaces. It is well known that chloride-based salts such as magnesium chloride, calcium chloride, and sodium chloride (rock salt) serve as deicers when applied to surfaces by lowering the freezing point of water. While varying in their effectiveness, such salts may present certain drawbacks such as corrosion and poor road/pavement bonding resulting in run-off to the environment. Consequently, there is a need for additives that reduce such drawbacks or otherwise enhance the deicing performance of chloride-based salts.

SUMMARY

In accordance with one aspect of the present disclosure, a deicer composition is disclosed. The deicer composition may comprise water, a metal chloride salt, and a biopolymer composition. The biopolymer composition may be derived from wheat straw, alfalfa, or other cereal grain straws, and may include inorganic material and a copolymer comprised of lignin and polysaccharides, the lignins being polydisperse and having an average molecular weight between 3500 and 5500 Daltons.

In accordance with another aspect of the present disclosure, a deicer composition is disclosed. The deicer composition may comprise water, a metal chloride salt, and a sulfonated biopolymer composition obtained as a lignin/hemicellulose co-product from pulp processing of wheat straw, alfalfa, or other cereal grain straws. The biopolymer composition may include inorganic material and a copolymer comprised of lignin and polysaccharides.

In accordance with another aspect of the present disclosure, a method of making a deicer composition is disclosed. The method may comprise obtaining a dilute lignin pulp liquor derived from wheat straw, alfalfa, or other cereal grain straws. The dilute liquor may include water, inorganic material, and a copolymer comprised of lignin and polysaccharides. The method may further comprise filtering the dilute liquor to remove undissolved fiber related solids and concentrating the dilute liquor to provide a biopolymer composition. In addition, the method may further comprise blending the biopolymer composition with a metal chloride salt to provide the deicer composition.

These and other aspects and features of the present disclosure will be more readily understood when read in conjunction with the accompanying drawings.

DETAILED DESCRIPTION OF THE DISCLOSURE

Figure 1:
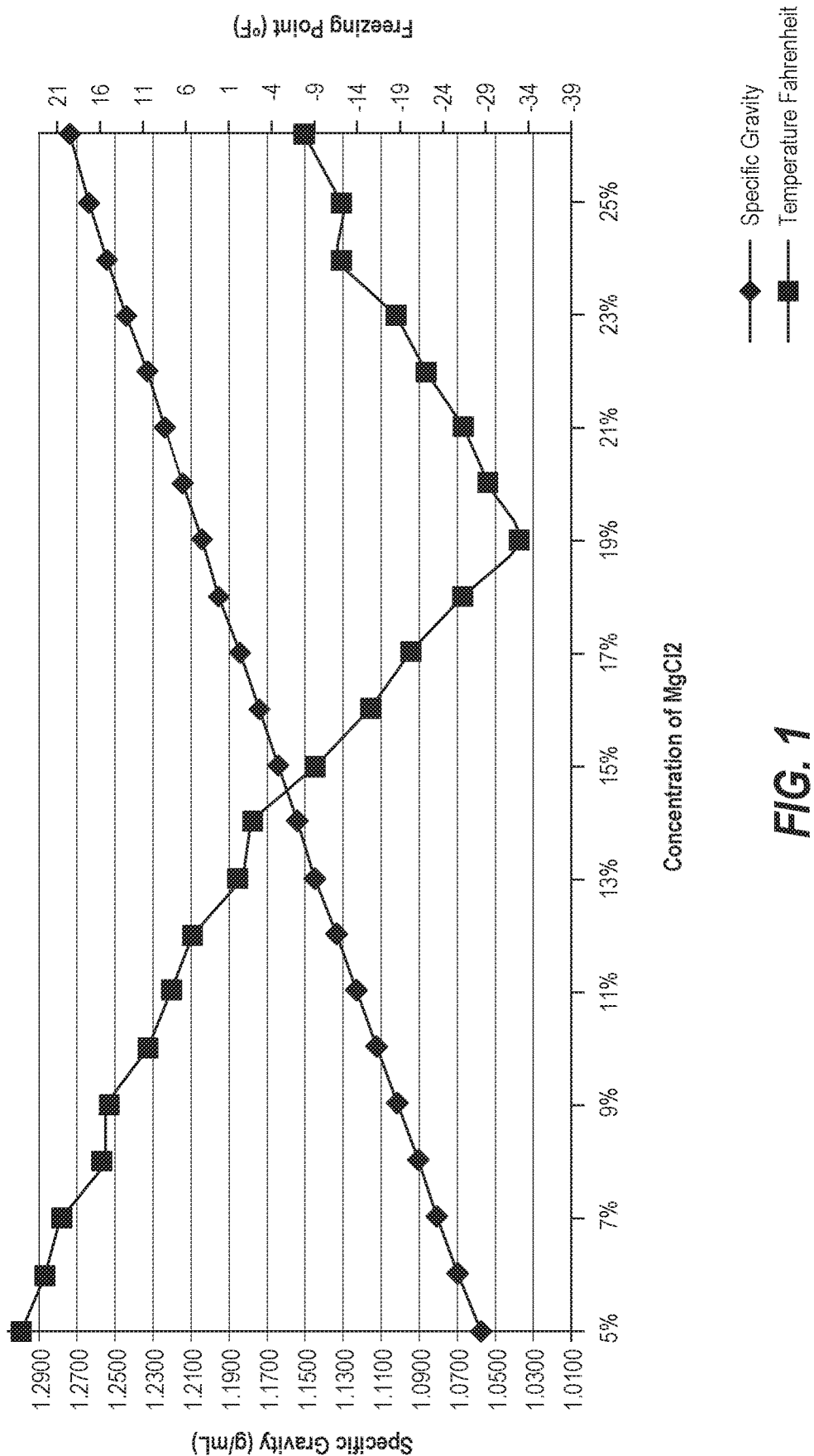
FIG. 1 is a data plot showing the change in freezing point of a deicer composition in accordance with the present disclosure.

While the invention described herein may be embodied in many forms, there will herein be described in detail one or more embodiments with the understanding that this disclosure is to be considered an exemplification of the principles of the invention and is not intended to limit the disclosure to the specific embodiments. Aspects of the different embodiments can be combined with or substituted for one another.

The present disclosure pertains to a deicer composition and a method of making a deicer composition. The deicer composition may be applied to various surfaces (e.g., roadways, driveways, sidewalks, vehicles, etc.) to reduce or prevent the accumulation of snow, ice, or frost on the surface. As explained further below, the deicer composition includes a chloride-based salt blended with a biopolymer composition which serves as a novel performance-enhancing additive to the chloride-based salt. The biopolymer composition is a lignin/hemicellulose co-product produced during pulp processing of wheat straw, alfalfa, or other cereal grain straws. This biopolymer composition is obtained as a liquor separated from the cellulose material during pulp processing and is further processed into the deicer composition. The biopolymer composition is not derived from and does not compete with food or food sources, and out performs other organic additives as a performance enhancer for chloride-based salt deicers. The use of the biopolymer composition as a deicing performance enhancer provides an industrial application for excess wheat straw residue remaining in fields after wheat straw harvesting. As explained further below, the lignin and polysaccharides in the biopolymer composition are chemically distinct from lignin and polysaccharides obtained from wood sources during kraft pulping processes or sulfite pulping processes.

Deicer Compositions

According to one embodiment, the deicer composition includes water, a chloride-based salt, and a biopolymer composition derived from wheat straw, alfalfa, or other cereal grain straws. The biopolymer composition is obtained as a lignin/hemicellulose co-product from pulp processing of non-wood sources including wheat straw, alfalfa, or other cereal grain straws such as, but not limited to, rice straw, barley straw, oat straw, and flax straw. The biopolymer composition includes water, inorganic material, and a complex copolymer of naturally-occurring lignin and polysaccharides. The chloride-based salt may be selected from magnesium chloride, calcium chloride, sodium chloride, and combinations thereof.

In one embodiment, the deicer composition may include 65-75% by weight water, 25-35% by weight chloride-based salt, and 1-10% by weight of the biopolymer composition (see Table 1). In other embodiments, the deicer composition may include 2-3% by weight of the biopolymer composition. In one particular embodiment, the deicer composition may include about 73% by weight water, about 25% by weight magnesium chloride, and about 2% by weight of the biopolymer composition.

TABLE 1

Example Deicer Composition

| Component | Percent by weight |
|---|---|
| water | 65-75% |
| metal chloride salt | 25-35% |
| biopolymer composition | 1-10% |

The deicer compositions of the present disclosure may have a pH of 7-9, and a specific gravity of 1.25-1.35 (10.43-11.26 lb./gal.).

In one embodiment, the biopolymer may be a sulfonated biopolymer composition. The sulfonated biopolymer composition is formed by oxidizing the biopolymer to remove some methoxl groups, then sulphonating the aromatic ring. The sulfonated biopolymer composition may have a wider pH solubility range and increased corrosion inhibition properties.

Chemical and Physical Properties of the Biopolymer Composition

The biopolymer composition is obtained as a lignin/hemicellulose co-product from pulp processing of non-wood sources including wheat straw, alfalfa, or other cereal grain straws such as, but not limited, to rice straw, barley straw, oat straw, and flax straw. The biopolymer composition includes water, inorganic material, and a complex copolymer of naturally-occurring lignin and polysaccharides. This biopolymer composition is obtained as a liquor separated from the cellulose material during pulp processing. The biopolymer composition is not derived from and does not compete with food or food sources, and outperforms other organic additives as a performance enhancer for chloride-based salt deicers. The use of the biopolymer composition as a deicing performance enhancer provides an industrial application for excess wheat straw residue remaining in fields after wheat straw harvesting.

The biopolymer composition may include solids, wherein the total solids in the biopolymer composition includes dissolved solids and, in some cases, a small fraction of undissolved solids. The undissolved solids may include suspended or colloidal solids. In one embodiment, the biopolymer composition includes 25-55% weight percent total solids. In one specific embodiment, the biopolymer composition includes about 50% weight percent total solids.

In one embodiment, the biopolymer composition comprises about 25-50% by weight water, about 5-20% by weight lignin, about 5-20% by weight polysaccharides, and about 15-30% by weight inorganic material. For example, in one specific embodiment, the biopolymer composition comprises about 50% by weight water, about 12.5% by weight lignin, about 12.5% by weight polysaccharides, and about 25% by weight of inorganic material.

The polysaccharides in the biopolymer composition are bonded to the lignin as a copolymer. The polysaccharides may at least include polydisperse hemicellulose of varying molecular sizes. The lignin may be polydisperse and of varying molecular sizes. The average molecular weight may be between 3500 and 5500 Daltons. The results of tests on one embodiment of the biopolymer composition are shown in Table 2 below. The polydisperse lignin and the polydisperse hemicellulose can be present as a copolymer, or each of the polydisperse lignin and the polydisperse hemicellulose can be present separately. The polydispersities of the lignin and hemicellulose in the biopolymer composition of the present disclosure are distinct from the polydispersities of lignins and hemicellulose derived from wood species.

TABLE 2

Molar Mass Distribution of Biopolymer Lignin Fraction (Gel Permeation Chromatography data)

| Number-average molecular weight (Mn) (Daltons) | Peak molecular weight (Mp) (Daltons) | Weight-average molecular weight (Mw) (Daltons) | Z-average molecular weight (Mz) (Da) | Mw/Mn |
|---|---|---|---|---|
| 3878-5120 | 4304-6638 | 11288-22287 | 25570-148361 | 3.4-5.6 |

The lignin may have a high content of hydroxyl (OH) and carboxylic acid (COOH) groups as compared to lignin derived from wood-species pulping processes (see Table 3 below). The methoxy (OMe) group content is provided in Table 4 below. The hydroxyl, carboxylic acid, and methoxy group contents of the lignin of the present disclosure are distinct from the hydroxyl, carboxylic acid, and methoxy group contents of lignins derived from wood sources.

TABLE 3

Hydroxyl (OH) and Carboxyl (COOH) Group Content of Biopolymer Lignin Fraction.

| Group | millimoles/gram (mmol/g) |
|---|---|
| aliphatic OH | 1.38-2.88 |
| syringyl, condensed | 0.22-0.57 |
| guaiacyl, catechol | 0.27-0.67 |
| aromatic OH | 0.48-1.24 |
| carboxyl COOH | 0.31-0.92 |
| Total OH | 1.87-4.12 |

TABLE 4

Methoxy (OMe) Group Content of Biopolymer Lignin Fraction.

| Average OMe, mmol/g | Standard Deviation, mmol/g | RSD (relative standard deviation), % |
|---|---|---|
| 2.72-4.72 | 0.03-0.10 | 0.54-3.60 |

The polysaccharides in the biopolymer composition includes a mixture of five and six carbon sugars. According to sugar analysis performed by acid methanolysis, the predominant five carbon sugars include xylose (Xyl) and arabinose (Ara), and the predominant six carbon sugars include glucose (Glc), galactose (Gal), galacturonic acid (GalUA), glucuronic acid (GlcUA), and 4-O-methylglucouronic acid (4OMeGlcUA) (see FIG. 2). In addition to these sugars, the polysaccharides further include sugar units of rhamnose (Rha), fucose (Fuc), and mannose (Man). The biopolymer composition contains little to no fructose and, therefore, little to no sucrose (a disaccharide of glucose and fructose). In one embodiment, the polysaccharides may have about 60% five carbon sugars and about 40% six carbon sugars. The biopolymer composition has a low concentration of low molecular weight saccharinic acids derived from the sugars when treated under alkaline conditions. Isosaccharinic acids are formed from the six carbon sugars, and a comparable acid is formed from xylose. These acids form strong and stable complexes with di- and trivalent cations. The sugar profile of the polysaccharides in the biopolymer composition of the present disclosure is distinct from the sugar profile of polysaccharides derived from wood pulping processes.

The biopolymer composition contains a high content of alkyl and aromatic groups. The lignin reacts easily at the β-O-4 position forming alkyl and aromatic hydroxyl groups. In addition, the lignin of the biopolymer composition of the present disclosure has a higher content of carboxylic acid groups and a higher oxygen/carbon (O/C) ratio than lignins derived from other types of pulping processes. The high content of hydroxyl and carboxylic acid (COOH) (see Table 3) provide the biopolymer composition with a high cation exchange capacity, with all cations exchanging with the lignin. The polysaccharides in the biopolymer composition also contain hydroxyl and carboxylic acid groups. Reaction of the lignin β-O-4 cross-linked groups leads to low lignin molecular weights (from about 2,000 to about 20,000). The low lignin molecular weight combined with a high hydroxyl group content leads to a higher lignin reactivity.

The polysaccharides in the biopolymer composition are chemically bonded to lignin and tend to keep the copolymer dissolved at a pH equal to 7.5 and above. By contrast, other alkaline lignins are soluble in water across the pH range of 1-14. Thus, the copolymer of the present disclosure is less soluble at a pH below 7.5 than other alkali lignins. The sulfonated biopolymer composition may have a wider solubility range of 1-14.

The amorphous nature of the lignin/hemicellulose copolymers results in medium and large molecules (heavy molecular weight), providing the copolymer with polydispersity (see Table 2). The density of the biopolymer composition varies from about 1.05 to 1.25 g/ml depending on the concentration of solids. This density will cause fine droplets to settle rapidly during spray application. Additionally, the polymeric lignin/polysaccharide material of the biopolymer composition becomes sticky/tacky when dried and adheres to surfaces.

Furthermore, the biopolymer composition of the present disclosure acts as a corrosion inhibitor as the copolymer ion exchange sites attach to metal surfaces, forming a surface layer that protects against corrosion by salts of magnesium, calcium, and sodium. As such, the deicer composition of the present disclosure is less corrosive to vehicles and concrete surfaces than chloride-based salts alone. The sulfonated biopolymer composition has increased ion exchange sites, allowing a great metal complexing capacity. Therefore, the sulfonated biopolymer composition may be even more effective at protecting against corrosion.

Moreover, the biopolymer composition of the present disclosure improves surface bonding and enhances the adhesion of chloride-based salts to road surfaces, thereby preventing run-off and associated chloride losses to the environment. The reduced run-off is due to the complexing action of the copolymer with chloride. This translates to chloride savings and prolonged activation. Moreover, the complexed biopolymer with chloride prevents a portion of the chloride from becoming airborne after dehydration and being lost to the environment. This reduces waste and increases the duration of the deicing activity.

Additionally, the biopolymer composition acts as an ice crystallization retarder at lower temperatures, impeding the formation of ice on surfaces. It also acts as a rheology modifier and tackifier, increasing the viscosity of the deicer and improving the adherence of the chloride-based salt to surfaces. Even further, the biopolymer composition serves as a colorant and improves visibility of the deicer when applied to surfaces.

The deicer composition may be non-toxic to waterways, animals, and plants. Standard toxicity tests were run for a deicer composition in accordance with the present disclosure containing magnesium chloride as the metal chloride salt. No statistically significant chronic toxicity was found in the Fathead Minnow (*Pimephales promelas*) survival test at any of the concentrations tested. No statistically significant chronic toxicity was found in the *Ceridaphnia dubia* survival test at any of the concentrations tested. Further, no statistically significant toxicity was found in the freshwater green algae (*Selenastrum capricornutum*) growth inhibition study at any of the concentrations tested.

FIG. 1 is a data plot showing the change in freezing point of a deicer composition in accordance with the present disclosure containing magnesium chloride as the metal chloride salt as it is diluted with increasing amounts of water.

Figure 2:
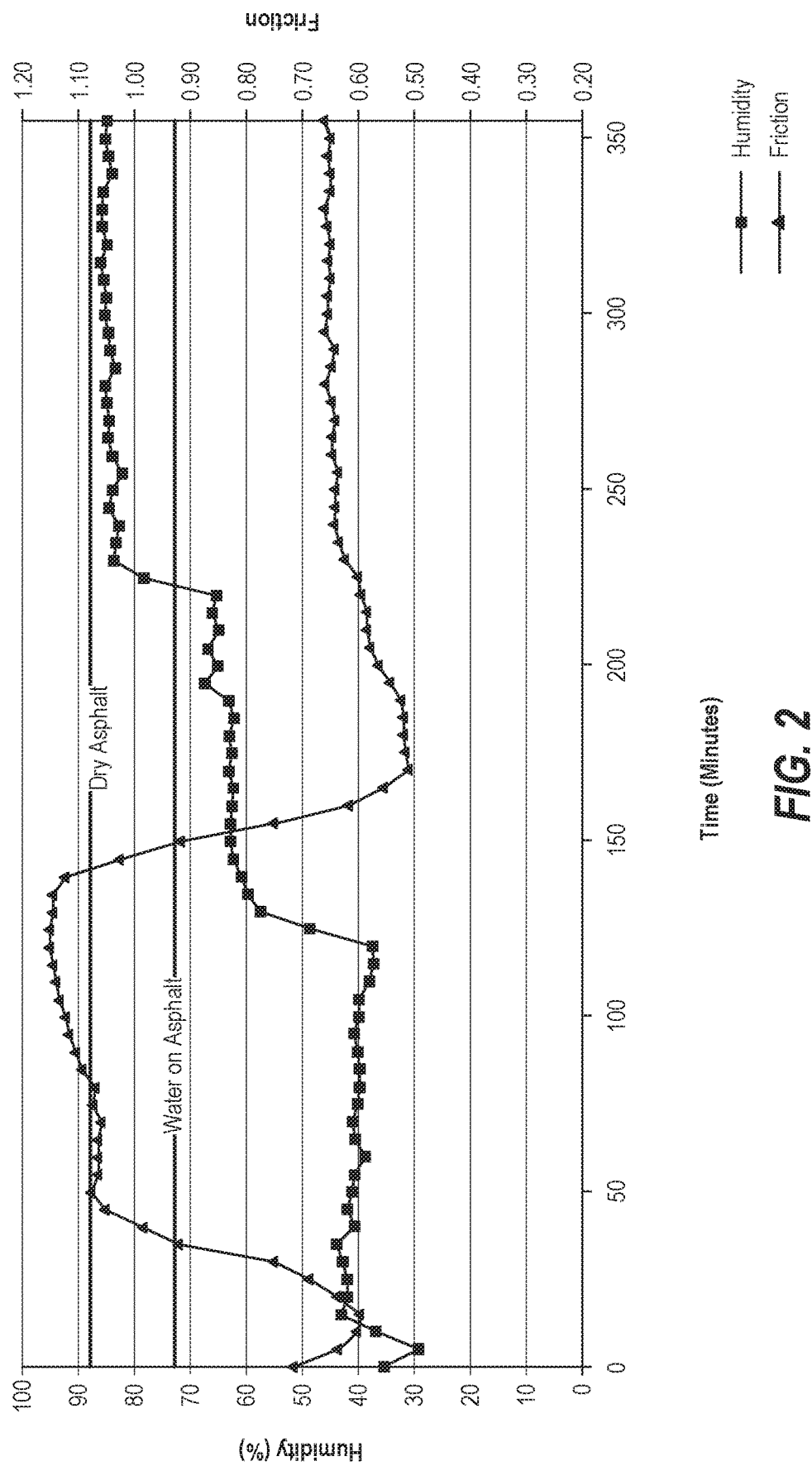
FIG. 2 is a data plot showing the change in friction on asphalt test surface with application of a deicer composition in accordance with the present disclosure.

FIG. 2 is a data plot showing the change in friction on asphalt test surface at various humidity levels with application of a deicer composition in accordance with the present disclosure containing magnesium chloride as the metal chloride salt.

Method of Making Deicer Compositions

Figure 3:
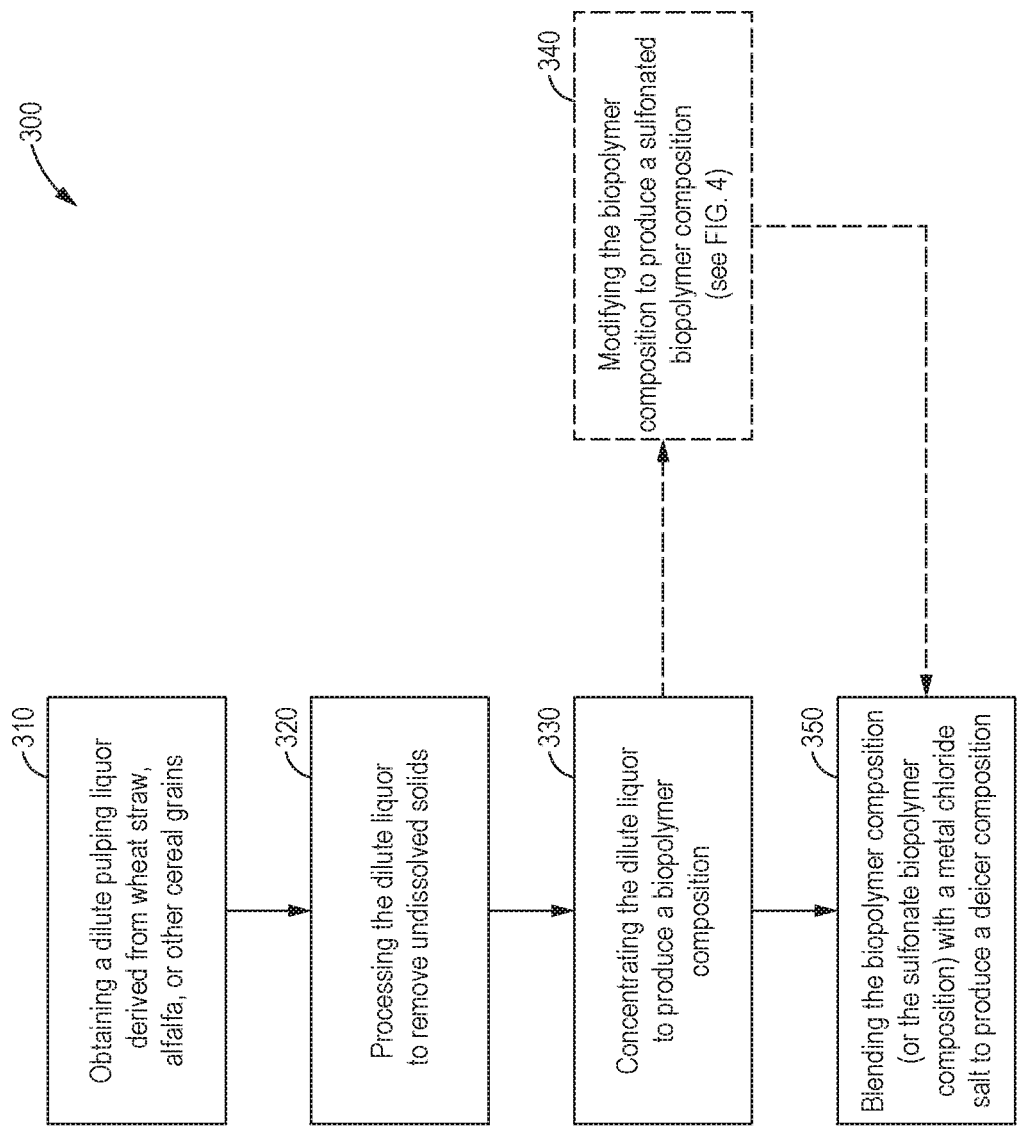
FIG. 3 is a flowchart illustrating a series of steps that may be involved in making the deicer composition of the present disclosure.

A method which may be used for producing the deicer composition is depicted in FIG. 3. Initially, a dilute lignin liquor is obtained as a dilute lignin/hemicellulose co-product from pulp processing of wheat straw, alfalfa, or other cereal grain straws (block 310). This dilute liquor is an aqueous solution including inorganic material and a polydisperse copolymer of lignin and polysaccharides, and contains approximately 5-12% total solids including both dissolved and undissolved solids. Subsequently, the dilute liquor is further processed to remove the undissolved solids through a combination of solid removal steps including multiple settling and decanting steps, and filtration through mechanical systems, such as through a 100 micron bag-type filter, a frame and plate disk filter, and/or a decanter centrifuge (block 320). The filtration steps to remove undissolved solids may be optionally assisted with one or more surfactants, dispersants, flocculants, and/or coagulants. For instance, the filtration step may be assisted with one or more surfactants to aid in the separation of fibrous fines.

The filtered dilute liquor is then concentrated to reduce the water content to about 45-50% by weight (block 330) and create the biopolymer composition referred to throughout this disclosure. For this purpose, suitable drying/evaporation technologies include, but are not limited to, multieffect evaporation, spray drying, freeze drying, and/or drum drying. Optionally, a defoaming agent may be used to reduce foaming of the biopolymer composition during concentration and subsequent blending with the chloride salts.

The biopolymer composition may include 5-20% by weight lignin, 5-20% by weight polysaccharides, and 15-30% by weight inorganic material. After concentration, the content of total solids in the biopolymer composition is 25-55% by weight. The total solids remaining after the filtration step includes mostly dissolved solids and a small fraction of undissolved solids (including colloidal solids). Optionally, one or more cationic, anionic, and/or nonionic surfactants, coagulants, and/or dispersants may be added to the biopolymer composition to affect the suspension of precipitates of lignin/hemicellulose under varied concentrations and pH ranges. Optionally, the biopolymer composition may be fully dried.

Figure 4:
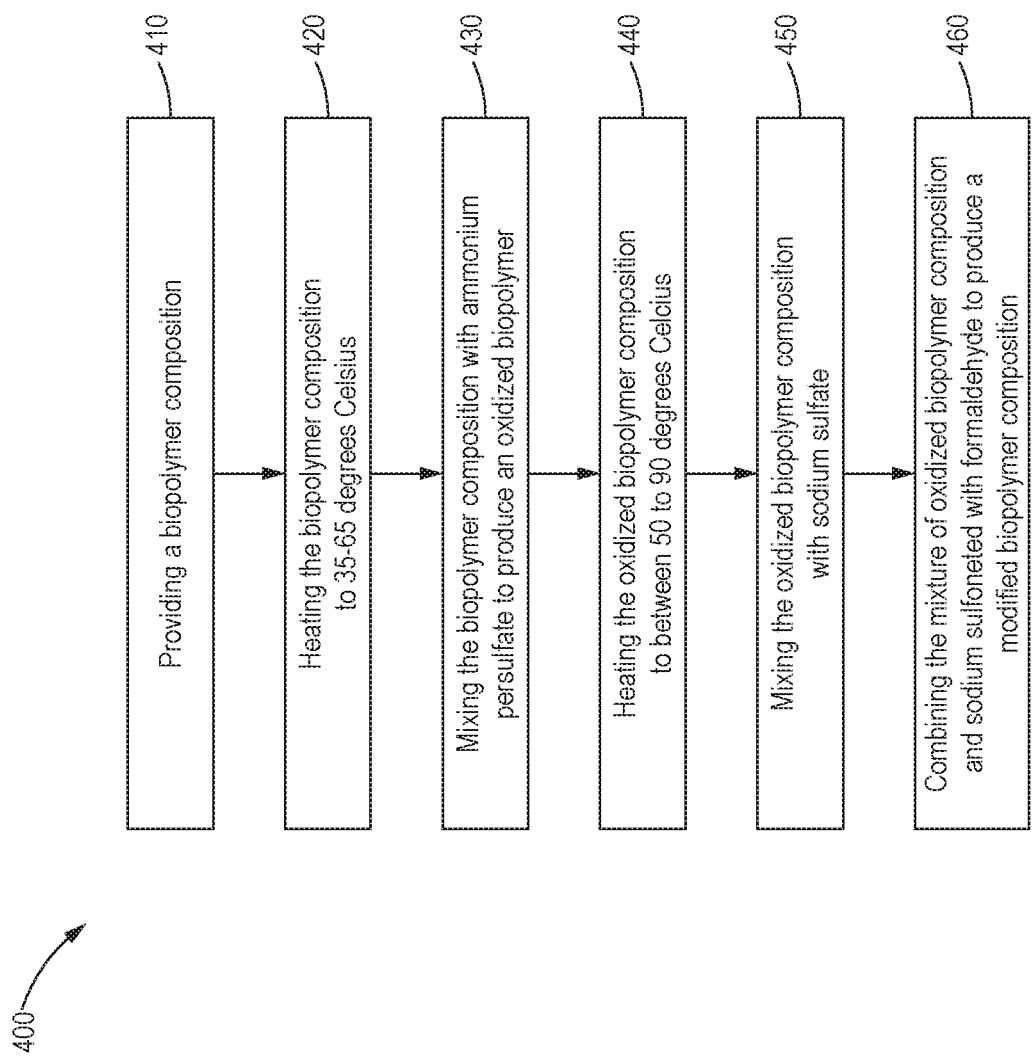
FIG. 4 is a flowchart illustrating a series of steps that may be involved in making a sulfonated biopolymer composition according to the present disclosure.

The biopolymer composition may optionally be further processed into a sulfonated biopolymer composition, as shown in block 340. The method is more fully described in FIG. 4 and begins with providing the biopolymer composition of block 330 (block 410). The biopolymer composition is heated to between 35 and 65 degrees Celsius (block 420) and then mixed with ammonium persulfate (block 430). In one embodiment, the amount of ammonium persulfate may be 5% of the weight of dry solids in the biopolymer. The mixing may take place over at least 10 minutes in some embodiments. The ammonium persulfate oxidizes the biopolymer composition and removes some methoxyl groups, producing an oxidized biopolymer composition. The oxidized biopolymer composition is heated to between 50 and 90 degrees Celsius (block 440). In some embodiments, it may be held at temperature for around one hour to allow the reaction to complete.

Next, the oxidized biopolymer may be mixed with sodium sulphite (block 450). It may be mixed for around 30 minutes. The sodium sulfite may be in a crystalline form. In one embodiment, the amount of sodium sulfite may be 7% of the weight of dry solids in the biopolymer. Finally, the mixture of sodium sulfite and the oxidized biopolymer may be combined with formaldehyde (block 460). In one embodiment, the formaldehyde may be at 37% concentration. In one embodiment, the amount of formaldehyde may be 5% of the weight of dry solids in the biopolymer. The sodium sulfite and formaldehyde react with the biopolymer to sulfomethylate the aromatic ring and produce a sulfonated biopolymer composition. The sulfonated biopolymer composition may be held at temperature for three hours to allow the reaction to complete.

The biopolymer composition (or sulfonated biopolymer composition) may then be blended with the chloride-based salt in various ways (block 350). For instance, the biopolymer composition in dry or liquid form may be blended with a dry or a liquid form of the chloride salt. In this regard, liquid-to-liquid, liquid-to-dry, dry-to-liquid, and dry-to-dry mixing may require different mixing methods.

Optionally, a preservative may be used to mitigate biological degradation of the biopolymer composition.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims.

What is claimed is:

1. A method of making a deicer composition, comprising:
   obtaining a dilute lignin pulp liquor composition derived from wheat straw, alfalfa, or other cereal grain straws;
   filtering the dilute lignin pulp liquor composition to remove undissolved fiber related solids to obtain a filtered dilute lignin pulp liquor composition;
   concentrating the filtered dilute lignin pulp liquor composition to provide a biopolymer composition comprising about 25-55% by weight of total solids; and
   blending the biopolymer composition with a metal chloride salt to produce a deicer composition; wherein the deicer composition comprises:
   65-75% by weight water;
   25-35% by weight of metal chloride salt; and
   1-10% by weight of the biopolymer composition.

2. The method of claim 1, wherein the metal chloride salt is selected from the group consisting of magnesium chloride, calcium chloride, and sodium chloride.

3. The method of claim 1, wherein, prior to the blending step, the method further comprises sulfonating the biopolymer composition.

4. The method of claim 3, wherein sulfonating the biopolymer composition comprises:
   heating the biopolymer composition to between 35 and 65 degrees Celsius;
   mixing the biopolymer composition with ammonium persulfate to produce an oxidized biopolymer composition;
   heating the oxidized biopolymer composition to between 50 and 90 degrees Celsius;
   mixing the oxidized biopolymer composition with sodium sulfite; and
   combining the mixture of oxidized biopolymer composition and sodium sulfite with formaldehyde.

5. The method of claim 4, wherein the sulfonating process further comprises holding the oxidized biopolymer composition between 50 and 90 degrees for between 30 to 90 minutes.

* * * * *